United States Patent [19]

Kaplan et al.

[11] Patent Number: 5,747,212

[45] Date of Patent: May 5, 1998

[54] FUSING SYSTEM WITH AMINO FUNCTIONAL GROUPS IN SILOXANE RELEASE AGENT FOR USE WITH TONERS AND FUSING MEMBERS REACTIVE WITH AMINE GROUPS

[76] Inventors: Samuel Kaplan, 1974 Finley Rd., Webster, N.Y. 14568-9787; David H. Pan, 10 Westfield Commons, Rochester, N.Y. 14625; George J. Heeks, 72 Oakcrest Dr., Rochester, N.Y. 14617; Clifford O. Eddy, 248 Shorewood Dr., Webster, N.Y. 14581-1321; Che C. Chow, 286 Valley Green Dr., Penfield, N.Y. 14526; Santokh S. Badesha, 48 Bromley Rd., Pittsford, N.Y. 14534; Arnold W. Henry, 43 Deer Creek Rd., Pittsford, N.Y. 14534; Donald A. Seanor, 264 Garnsey Rd., Pittsford, N.Y. 14534

[21] Appl. No.: 315,004

[22] Filed: Sep. 29, 1994

Related U.S. Application Data

[63] Continuation-in-part of Ser. No. 164,853, Dec. 10, 1993, abandoned.

[51] Int. Cl.$^6$ .................................................. G03G 15/20
[52] U.S. Cl. ........................... 430/124; 430/99; 399/325; 399/331; 118/60
[58] Field of Search ........................... 430/124, 99; 106/2, 106/287, 11, 287.14; 556/424, 425, 453; 399/325, 331; 118/60

[56] References Cited

U.S. PATENT DOCUMENTS

| | | | |
|---|---|---|---|
| 2,947,771 | 8/1960 | Bailey | 260/448.2 |
| 4,029,827 | 6/1977 | Imperial et al. | 427/22 |
| 4,101,686 | 7/1978 | Strella et al. | 427/22 |
| 4,185,140 | 1/1980 | Strella et al. | 428/418 |
| 4,257,699 | 3/1981 | Lentz | 355/3 |
| 4,264,181 | 4/1981 | Lentz et al. | 355/3 |
| 4,272,179 | 6/1981 | Seanor | 355/3 |
| 5,017,432 | 5/1991 | Eddy et al. | 428/422 |
| 5,061,965 | 10/1991 | Finsterwalder et al. | 355/284 |
| 5,063,260 | 11/1991 | Chen et al. | 523/213 |
| 5,157,445 | 10/1992 | Shoji et al. | 355/284 |

FOREIGN PATENT DOCUMENTS

| | | |
|---|---|---|
| 2-85113 | 12/1991 | Japan. |
| 3284780 | 12/1991 | Japan. |

OTHER PUBLICATIONS

Leo A. Wall, *High Polymers—A Series of Monographs on the Chemistry, Physics, & Technology of High Polymeric Substances*, "Fluoropolymers," Wiley-Interscience, vol. XXV, pp. 293–301.

Y. Shoji & Y. Uehara, *IS & T Final Program and Proceedings—IS & T's Eighth International Congress on Advances in non–Impact Printing Technologies*, "Soft Roll Fuser for Color Copiers", IS & T: The Society for Imaging Science & Technology, Oct. 25–30, 1992, pp. 96–100.

*Fluoropolymers*, Ed L. Wall, p. 294, Wiley–Interscience, 1972.

"Soft Roll Fuser for Color Copiers" I.S. & I.T. Final Program and Proceedings, 8th International Congress on Advances on Non–Impact Printing Technology, Oct. 25–30, 1992, pp. 96–100.

*Primary Examiner*—Thorl Chea
*Attorney, Agent, or Firm*—Annette L. Bade

[57] ABSTRACT

A method of fusing and a fusing system are provided for a fusing member having a thermally stable FKM hydrofluoroelastomer surface for fusing thermoplastic resin toners which are susceptible to amines to a substrate in an electrostatographic printing apparatus with an amino functional oil having the formula:

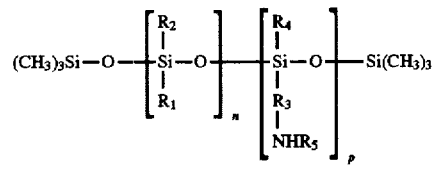

where $50 \leq n \leq 200$, p is 1 to 5 and $R_1$, $R_2$ and $R_3$ are selected from the group consisting of alkyl and arylalkyl radicals having 1 to 18 carbon atoms, $R_4$ is selected from the group consisting of alkyl and arylalkyl radicals having 1 to 18 carbon atoms and a polyorganosiloxane chain having 1 to 100 diorganosiloxy repeat units, and $R_5$ is selected from the group consisting of hydrogen, alkyl and arylalkyl radicals having 1 to 18 carbon atoms, wherein at least 85% of the polyorgano amino functional siloxane chains have p equal to 1 and the

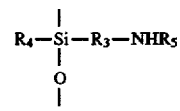

groups are situated at random along the chain, said oil having predominantly monoamino functionality per active molecule to interact with said hydrofluoroelastomer surface to provide an interfacial barrier layer to said toner and a low surface energy film to release said toner from said surface.

12 Claims, 1 Drawing Sheet

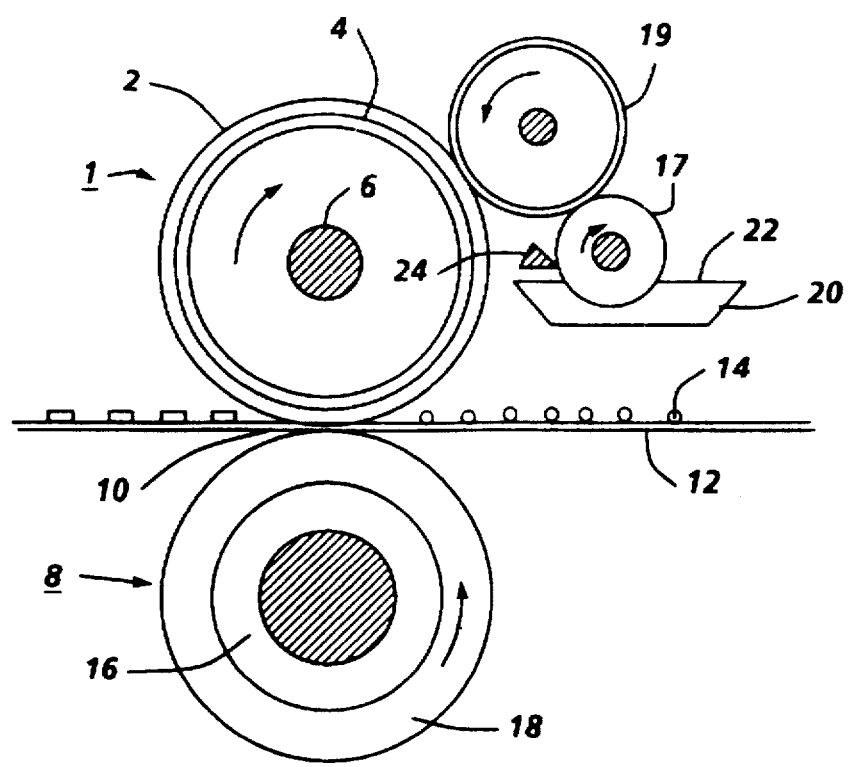

FUSING SYSTEM WITH AMINO FUNCTIONAL GROUPS IN SILOXANE RELEASE AGENT FOR USE WITH TONERS AND FUSING MEMBERS REACTIVE WITH AMINE GROUPS

This application is a continuation in part of U.S. application Ser. No. 08/164,853 filed Dec. 10, 1993, now abandoned, in the name of Henry et al. and entitled, Fusing System With Monoamino Functional Silicone Release Agent.

REFERENCE TO RELATED APPLICATION

Attention is directed to U.S. application Ser. No. 08/314,759 (D/93569I) entitled "Fusing System With Monoamino Functional Silicone Release Agent" in the name of Arnold W. Henry et al. and U.S. application Ser. No. 08/315,006 (D/93569I2) entitled "Fusing Method And System With Hydrofluoroelastomers Fuser Member For Use With Amino Functional Silicone Oils" in the name of Arnold W. Henry et al.

BACKGROUND OF THE INVENTION

The present invention relates to a fusing system, method of fusing as well as a release agent for the fusing system in an electrostatographic printing apparatus. In a particular embodiment it relates to the use of a monoamino functional silicone oil as a release agent in such a fusing system where the toner is reactive with amines and the fuser member is a thermally stable hydrofluoroelastomer.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher depending upon the softening range of the particular resin used in the toner. It is not desirable, however, to raise the temperature of the substrate substantially higher than about 200° C. because of the tendency of the substrate to discolor at such elevated temperatures particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus, increasing the background or interfering with the material being copied there. The so called "hot offset" occurs when the temperature of the toner is raised to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To insure and maintain good release properties of the fuser roll, it has become customary to apply release agents to the fuser members to insure that the toner is completely released from the fuser roll during the fusing operation. Typically, these materials are applied as thin films of, for example, silicone oils to prevent toner offset.

PRIOR ART

Some recent developments in fuser members, release agents and fusing systems are described in U.S. Pat. No. 4,264,181 to Lentz et al., U.S. Pat. No. 4,257,699 to Lentz and U.S. Pat. No. 4,272,179 to Seanor, all commonly assigned to the assignee of the present application. These patents describe fuser members and methods of fusing thermoplastic resin toner images to a substrate wherein a polymeric release agent having functional groups is applied to the surface of the fuser member. The fuser member comprises a base member having an elastomeric surface with a metal containing filler therein which has been cured with a nucleophilic addition curing agent. Exemplary of such fuser member is an aluminum base member with a poly(vinylidenefluoride-hexafluoropropylene) copolymer cured with bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high rates of speed of electrostatographic reproducing machines.

While the mechanism involved is not completely understood it has been observed that when certain polymeric fluids having functional groups are applied to the surface of a fusing member having an elastomer surface with a metal oxide, metal salt, metal, metal alloy or other suitable metal compounds dispersed therein there is an interaction (a chemical reaction, coordination complex, hydrogen bonding or other mechanism) between the metal of the filler in the elastomer and the polymeric fluid having functional groups so that the polymeric release agent having functional groups in the form of a liquid or fluid provides an excellent surface for release, having an excellent propensity to remain upon the surface of the fuser member. Regardless of the mechanism, there appears to be the formation of a film upon the elastomer surface which differs from the composition of the elastomer and the composition of the polymeric release agent having functional groups. This film, however, has a greater affinity of the elastomer containing a metal compound than the toner and thereby provides an excellent release coating upon the elastomer surface. The release coating has a cohesive force which is less than the adhesive forces between heated toner and the substrate to which it is applied and the cohesive forces of the toner.

The use of polymeric release agents having functional groups which interact with a fuser member to form a thermally stable, renewable self-cleaning layer having superior release properties for electroscopic thermoplastic resin toners is described in U.S. Pat. Nos. 4,029,827 to Imperial et al., U.S. Pat. No. 4,101,686 to Strella et al. and U.S. Pat. No. 4,185,140 also to Strella et al., all commonly assigned to the assignee of the present invention. In particular, U.S. Pat. No. 4,029,827 is directed to the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids. Some of these fusing systems have enjoyed significant commercial application. For example, a fuser roll made from Viton E 45 (a copolymer of 77 weight percent vinylidenefluoride and 23 weight percent hexafluoropropylene) filled with lead oxide has been successfully used in a fusing system employing a mercapto functional polyorganosiloxane release agent.

U.S. Pat. No. 5,157,445 to Shoji et al. discloses a fixing device for an electrophotographic printer which uses a toner release agent containing as an active ingredient a functional group containing organopolysiloxane. The functional group may be —$NH_2$. The general formula 1 of this patent does not require any —$NH_2$ groups per molecule and the general formula 2 permits up to 10 —$NH_2$ groups per molecule.

When the mercapto functional polyorganosiloxane release agent was used in the Xerox 5775 color copier, an unexpectedly and unacceptable low release life of only about 30,000 copies was achieved and accordingly an investigation into alternative fusing systems including different functional release agents was undertaken. One of the first alternative release agents investigated was an amino functional polyorganosiloxane release agent which had a relatively high number of functional amino groups per active molecule of the order of 3 to 5. Evaluation of this release agent with 4 new rolls in the Xerox 5775 Color Copier showed release failure in each instance at about 3,000 prints.

SUMMARY OF THE INVENTION

While there may be a small amount of multifunctionality in the release agent there is an insufficient amount to react with both toner and hydrofluoroelastomer to form any significant amount of adhesion between toner and hydrofluoroelastomer. It is theorized that this lack of adhesion is due to the multiple functionalities on some chains reacting with either the toner or the fluoroelastomer but not both or some dynamic equilibrium of oil and toner being initially adsorbed onto and mechanically abraded from the roll surface.

According to the present invention, a fusing system and method of fusing toner images to a substrate where the toner is susceptible to reaction with amines comprise a fuser member of a thermally stable FKM hydrofluoroelastomer fusing surface and a toner release agent on said fusing surface which comprises a fluid amino functional oil having the formula

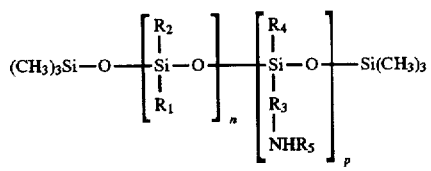

where $50 \leq n \leq 200$, p is 1 to 5 and $R_1$, $R_2$ and $R_3$ are selected from the group consisting of alkyl and arylalkyl radicals having 1 to 18 carbon atoms, $R_4$ is selected from the group consisting of alkyl and arylalkyl radicals having 1 to 18 carbon atoms and a polyorganosiloxane chain having 1 to 100 diorganosiloxy repeat units, and $R_5$ is selected from the group consisting of hydrogen, alkyl and arylalkyl radicals having 1 to 18 carbon atoms, wherein at least 85% of the polyorgano amino functional siloxane chains have p equal to 1 and the

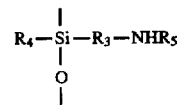

groups are situated at random along the chain, said oil having predominantly monoamino functionality per active molecule to interact with said hydrofluoroelastomer surface to provide an interfacial barrier layer to said toner and a low surface energy film to release said toner from said surface.

In a further aspect of the present invention the monoamino functional oil is prepared in a batch process in the absence of subsequent dilution with nonfunctional oil.

In a further aspect of the present invention the polyorgano siloxane chains have P equal to 1 and the aminofunctionality is provided by aminopropylmethyl siloxy groups.

In a further aspect of the present invention, the amino functional oil remains functionally fluid at temperatures of from about 30° F. to about 450° F. and has a viscosity of from about 100 to 1000 centipoise at 20° C.

For example, in the batch or one pot synthesis 0.067 mol % amino functionality in the feed results in 96% of active chains having one amino group and 4% having more than one amino groups.

In a further aspect of the present invention, the amino functional oil is present with nonfunctional organo siloxane oil in an amount of from about 0.01 to 0.30 mole percent of the total number of organo siloxy groups.

In a further aspect of the present invention the toner has an unsaturated olefinic bond that can react with amino.

In a further aspect of the present invention the toner is an unsaturated polyester.

In a further aspect of the present invention the amino functional oil reacts with only one of the toner and the hydrofluoroelastomer surface.

BRIEF DESCRIPTION OF THE DRAWINGS

FIG. 1 is a sectional view of a fuser system which may use the fuser member according to the present invention.

DETAILED DESCRIPTION OF THE PRESENT INVENTION

A typical fuser member of the present invention is described in conjunction with a fuser assembly as shown in FIG. 1 where the numeral 1 designates a fuser roll comprising elastomer surface 2 upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with a soft surface layer 18 thereon. Sump 20 contains a polymeric release agent 22 which may be a solid or liquid at room temperature, but is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24 a layer of polymeric release fluid can be applied initially to delivery roll 19 and subsequently to elastomer 2 in controlled thickness ranging from submicrometer thickness to thickness of several micrometers of release fluid. Thus, by metering device 24 about 0.1 to 2 micrometers or greater thickness of release fluid can be applied to the surface of elastomer 2.

As used herein, the term fuser member may be a roll, belt, flat surface or other suitable shape used in the fixing of thermoplastic toner images to a suitable substrate. It may take the form of a fuser member, a pressure member or a release agent donor member preferably in the form of a cylindrical roll. Typically, the fuser member is made of a hollow cylindrical metal core, such as copper, aluminum, steel and like, and has an outer layer of the selected cured fluoroelastomer. Alternatively, there may be one or more intermediate layers between the substrate and the outer layer of the cured elastomer if desired. Typical materials having the appropriate thermal and mechanical properties for such layers include silicone elastomers, fluoroelastomers, EPDM and Teflon PFA sleeved rollers.

The predominantly monoamino functional oil release agents according to the present invention can be represented by the formula 1

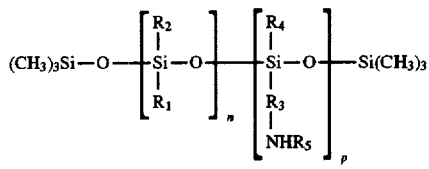

where $50 \leq n \leq 200$, p is 1 to 5 and $R_1$, $R_2$ and $R_3$ are selected from the group consisting of alkyl and arylalkyl radicals having 1 to 18 carbon atoms, $R_4$ is selected from the group consisting of alkyl and arylalkyl radicals having 1 to 18 carbon atoms and a polyorganosiloxane chain having 1 to 100 organosiloxy repeat units, and $R_5$ is selected from the group consisting of hydrogen, alkyl and arylalkyl radicals having 1 to 18 carbon atoms, wherein at least 85% and preferably about 93% of the polyorgano amino functional siloxane chains have p equal to 1 and if p is more than 1 the amino functional siloxane chains of the following formula II.

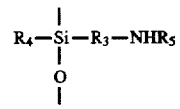

groups are situated at random along the chain, said oil having predominantly monoamino active molecules to interact with said hydrofluoroelastomer surface to provide an interfacial barrier layer to said toner and a low surface energy film to release said toner from said surface. If the amino group reacts only with the toner, an interfacial barrier layer is also formed which is at least in part carried off with the copy sheet. The amino functional oil may react with the hydrofluoroelastomer or the toner by similar reactions, the primary reaction being an addition reaction across a double bond. In the ideal case in the above formula p would equal 1 but as a practical matter it is difficult to limit all chains to a p of 1 and therefore the small range of p=1–5 is specified. By the term predominantly monoamino functional oil we mean that greater than 85% and preferably about 93% of the functional oil molecules have one and only one amino group on the silicone oil molecule hence, less than 15% of the active silicone oil molecules have more than one amino group covalently bonded to them. This is in sharp contrast to the organopolysiloxane of formula II in the above-referenced U.S. Pat. No. 5,157,445 which permits a multi-functionality of 10 when b=10 and where 100% of the active silicone oil molecules have more than 1 amino group covalently bonded to them.

The amino functional oil may be separately manufactured as a concentrate and subsequently diluted with nonfunctional polyorganosiloxane oil to provide a mixture with a distribution of amines in a large group of siloxanes. In making the concentrate a broader distribution of the amine functionality mono-, di- and tri-amino may be obtained. Alternatively, and preferably, in formulating the monoamino functional oil a desired level of amine concentration and final molecular weight are decided upon and the appropriate amounts of amine containing monomer, nonamine containing monomer, trimethylsiloxy end blocker and polymerization catalysts are added to the reaction vessel. This procedure maximizes the monoamino functionality per active molecule. In contrast to this procedure, where a concentrate is first prepared there is greater opportunity for a larger fraction being of multifunctionality since a concentrate is being prepared and there are a lot more amine groups present in the initial concentrate thereby creating the opportunity for greater amino functionality per active chain. In contrast, in the batch or one pot or one shot process the amount of ingredients added is varied to provide or maximize the monoamino functionality per active molecule. Although the batch or one shot process is preferred it is possible to make the monoamino functional oil according to the present invention in a continuous run process with appropriate control over the timing of addition and the amount of ingredients added. With regard to the manufacture of the amino functional oil according to the batch or one shot process, attention is directed to the above referenced U.S. application Ser. No. 08,314,739 (D/93569I) entitled "Fusing System With Monoamino Functional Silicone Release Agent" which is hereby specifically and totally incorporated by reference in the present application.

By the term active molecule as used herein we intend to define the silicone oil molecule having the amino functional group as part of its chemical structure. Typical substantially monoamino functional polyorganosiloxanes include among others, methyl aminopropyl methyl siloxane, ethyl aminopropyl methyl siloxane, benzyl aminopropyl methyl siloxane, dodecyl aminopropyl methyl siloxane, aminopropyl methyl siloxane. These monoamino polyorganosiloxanes typically have a viscosity of from about 100 to about 1,000 centipoise at 20° C. This permits easy handling of the oil particularly when delivering it to the fuser roll.

In a preferred embodiment the amino functionality is provided by aminopropyl methyl siloxy groups. As may be observed from the formula the functional amino group is at some random point in the backbone of the chain of the polyorganosiloxane which is flanked by trimethylsiloxy end groups. Also, as may be observed from the formula, the amino group may be a primary or a secondary amine wherein one of the hydrogens is substituted by $R_5$.

Of course it will be understood that the above described monoamino functional siloxane may be used in conjunction with nonfunctional organosiloxane oils provided that the amino functional organosiloxane chains comprise from about 0.01 to 0.30 mole percent of the total number of organosiloxy groups.

The FKM hydrofluoroelastomers, according to the present invention, are those defined in ASTM designation D1418-90 and are directed to fluororubbers of the polymethylene type having substituent fluoro and perfluoroalkyl or perfluoroalkoxy groups on a polymer chain.

The fluoroelastomers useful in the practice of the present invention are those described in detail in the above referenced U. S. Pat. No. 4,257,699 to Lentz, as well as those described in commonly assigned copending U.S. Pat. No. 5,017,432 to Eddy et al. and U.S. Pat. No. 5,061,965 to Finsterwalder et al. As described therein, these fluoroelastomers, particularly from the class of copolymers and terpolymers of vinylidenefluoride, hexafluoropropylene and tetrafluoroethylene, known commercially under various designations as Viton A, Viton E60C, Viton E430, Viton 910, Viton GH and Viton GF. The Viton designation is a Trademark of E. I. DuPont deNemours, Inc. Other commercially available materials include Fluorel 2170, Fluorel 2174, Fluorel 2176, Fluorel 2177 and Fluorel LVS 76, Fluorel being a Trademark of 3M Company. Additional commercially available materials include Aflas a poly(propylene-tetrafluoroethylene), Fluorel II (LII900) a poly(propylene-tetrafluoroethylene-vinylidenefluoride) both also available from 3M Company as well as the Tecnoflons identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Patent, and in U.S. Pat. No. 5,017,432 to Eddy et al.

In a particularly preferred embodiment, the fluoroelastomer is one having a relatively low quantity of vinylidenefluoride, such as in Viton GF, available from E. I. DuPont deNemours, Inc. The Viton GF has 35 weight percent vinylidenefluoride, 34 weight percent hexafluoropropylene and 29 weight percent tetrafluoroethylene with 2 weight percent cure site monomer. It is generally cured with a conventional aliphatic peroxide curing agent.

It is believed that the aminofunctional oil can react with any toner capable of reacting with amino groups and the fluoroelastomer fuser roll surface. Multifunctional amino silicone oil molecules can react simultaneously with both the unsaturation in toner and the fuser roll surface thereby adhering the toner to the fuser roll surface and forming the basis for further toner offset shortening the functional life of the fuser roll. Accordingly, a multifunctional amino oil has the capability of acting as an adhesive between the toner and FKM hydrofluoroelastomer fuser roll surface. A mono functional amino oil molecule can react either with the toner or the fluoroelastomer roll surface but not both hence it can not act as a toner/fuser roll adhesive. Furthermore, it is believed that the amino groups attack the hydrofluoroelastomer chain and form a chemical bond between the nitrogen atom and the chain by displacing a fluorine atom from the hydrofluoroelastomer chain (Ref. *Fluoropolymers*, Ed. L. Wall, p. 294, Wiley-Interscience, 1972). While some of the functional oil is consumed by being carried away by paper or worn off, the continuous resupply of release agent insures that the chemical bond between the amino groups and the hydrofluoroelastomer is maintained.

We have noted that when fusing crosslinked unsaturated polyester toner resins in the present amino functional release agents or oils with but a single functional group per active chain (0.07 mole percent amino functionality) fuser roll life is over 500,000 copies while using amino functional oils with the same number of active chains but with three amino groups per active chain (0.2 mole percent amine content) failure typically occurs after less than a few thousand copies. This indicates that increasing the number of amino groups by increasing the number of such groups per active chain while retaining the same number of active chains dramatically reduces fuser sub-system life. This reduction in fuser subsystem life is most pronounced when the amino groups in the silicone release agent can react on the one hand with the toner and on the other hand with the fuser member such as an FKM hydrofluoroelastomer available from E. I. DuPont deNemours Company under the designation Viton™. If the individual silicone chains in the release agent have more than one amine functional group, one can react both with the Viton surface and with the toner causing the toner to adhere to the Viton surface. The effect is that the oil acts as an adhesive, bounding the toner to the surface and raising the surface energy which will lead to short-term release failure. However, for the instance wherein the active chains that contain one and only one functional amine group, reaction with the Viton surface or the toner, but not both, simultaneously, with the siloxane chain can occur. Amino functional oil that reacts only with the hydrofluoroelastomer surface contributes to coverage of the surface with the low energy fluid that enhances release while amino functional oil that reacts with the toner is harmlessly carried away on the paper having a little effect on release.

An example of a toner containing an activated olefinic group is the resin which is a copolymer of bisphenol A, 1,2-propane diol and fumaric acid:

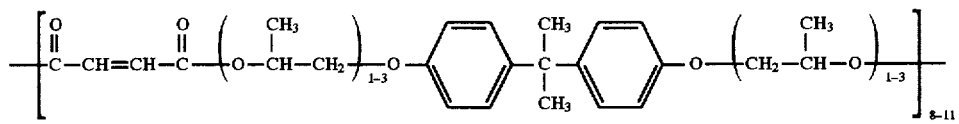

The double bond of the fumaric acid component of the resin can react with the amine group of the fuser oil by nucleophilic addition. With two or more amine groups on an individual silicone chain, possible reaction of the oil with the toner and with the Viton roll surface may lead to an effective bonding of toner to the surface with the consequence of early release failure. Accordingly, it is believed necessary that the amino functional silicone oil have only one functional amino group per active chain as the bonding of oil to toner and to the Viton fuser roll surface is indicated below.

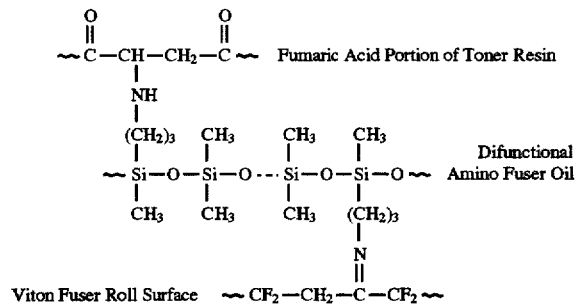

Such reactions of the amino functional silicone oil, however, is not limited to toner resins containing olefinic groups as amines are also known to react with esters of carboxylic acid. As indicated below, the polyester resins are susceptible to attack by amines as follows:

This combination of hydrofluoroelastomer and monoamino functional polyorganosiloxane has some enormous advantages in that there is no metal, metal oxide or other reactive filler necessary to be present in the fusing surface to act as an anchoring site for the release agent as in the case with the mercapto polyorganosiloxane release agent. In addition to simplifying the fabrication of the fusing surface, fusing performance is enhanced in that the degradative effect of the charge control agent on the fluoroelastomer is reduced and safety considerations due to the use of heavy metals are eliminated. Furthermore, there is no offensive odor such as with the mercapto functional release fluid in that there is no sulfur smell as a result of the presence of hydrogen sulfide. Furthermore, the monoamino functional polyorganosiloxane can react with any portion of the hydrofluoroelastomer and does not require the presence of a reactive site such as the copper oxide which is typically provided for many of these materials. The monoamino functional oil may of course be used with a hydrofluoroelastomer fusing surface which does contain metal or metal oxide reactive sites. In addition, the mercapto functional release agents begin with relatively small reactive sites which have to spread, making it much more difficult for the mercapto functional fluid to get complete coverage over the entire fusing surface since anchoring sites are necessary and the fluid has to bridge between the sites. Thus, for the same total number of amino groups there are more chains that are active and the amino groups are distributed as a relatively thin monolayer over the entire fusing surface.

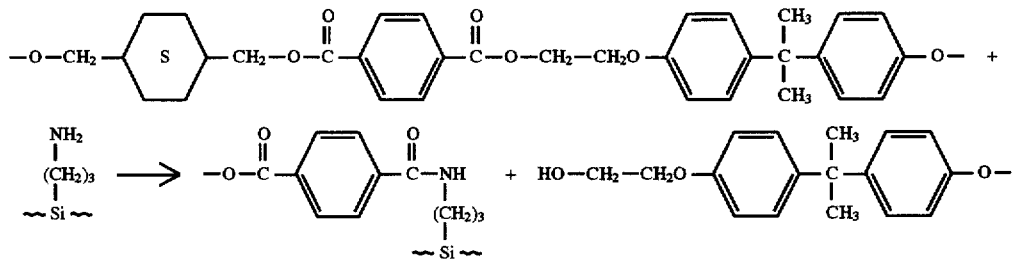

Similarly, to avoid the impact of all the amino functional silicone oil reacting with the polyester toner and the fuser roll simultaneously, the amino functional silicone oils must contain one and only one functional amino group per chain. This is best achieved by a batch or one pot synthesis without subsequent dilution by nonfunctional oil.

While there may be a small amount of multifunctionality in the release agent there is an insufficient amount to react with both toner and hydrofluoroelastomer to form any significant amount of adhesion between toner and hydrofluoroelastomer. It is theorized that this lack of adhesion is due to the multiple functionalities on some chains reacting with either the toner or the fluoroelastomer but not both or some dynamic equilibrium of oil and toner being initially adsorbed onto and mechanically abraded from the roll surface.

The following examples further define and describe the fusing system, method and release agent according to the present invention. Unless otherwise indicated all parts and percentages are by weight. Unless otherwise indicated all testing was conducted in the same manner and with the same equipment.

EXAMPLES

The described release agents were evaluated on a three inch bench web fixture, the web continuously running at 20 cm/sec. The fuser roll coating was comprised of 1.5 mm of a thermally conductive silicone rubber with a release overcoat of 0.050 mm Viton GF cured with DuPont's VC-50 curing system which did not contain any copper oxide. The Viton GF layer contained no heavy metal oxides. The fuser roll was 50 mm in diameter and was operated at 20 cm/sec. surface speed and at a run temperature of 360° F. which is 30° F. above the temperature at which image fix becomes acceptable.

A polyester toner was used and the image coverage was 50%. The level of toner as the image on the paper carrier was 1.0 mg/cm$^2$. The polyester was made with fumaric acid and hence it was unsaturated. The toner contained the proper amount of aerosil to promote toner flow and a charge control agent to provide the necessary tribo characteristics for toner development. Failure, hot offset, occurs when part of the toner image becomes attached to the fuser roll and is then transferred to the paper on the next revolution of the fuser roll.

The following are examples of possible synthesis of two types of amino functional silicone oil release agents which were used in the above experiments:

Example I
Making 350 cs Amino Functional Silicone Oil (Non-diluted Example)

Charge 13.5 kg of octamethy cyclotetrasiloxane, 11.7 g of aminopropyl methyl siloxane, 180 g of trimethyl silanol and sufficient potassium silanolate to yield a mixture that is 0.01 wt % potassium silanolate into a reaction vessel equipped with a reflux column and heat at 150° C. for 7 hours. Cool and neutralize with ammonium bicarbonate to produce an 0.055 mol % amino silicone oil having a number, average molecular weight of 13.65 Kg/mole and a viscosity of 350 cs. The fraction of amino functional silicone oil molecules having one and only one amino group is calculated to be 96%. An amino oil made according to this general procedure when utilized in the above described test yielded no hot offset after 500,000 prints.

Example II
Making 350 cs Amino Functional Silicone Oil (Diluted Example)

Charge 1.35 kg of octamethyl cyclotetrasiloxane, 14.4 g of aminopropyl methyl siloxane, 18 g of trimethyl silanol and sufficient potassium silanolate to yield a mixture that is 0.01 wt % potassium silanolate into a reaction vessel equipped with a reflux column and heat at 150° C. for 7 hours. Cool and neutralize with ammonium bicarbonate to produce an 0.67 mol % amino silicone oil having a number average molecular weight of 13.65 Kg/mole and a viscosity of 350 cs. The fraction of amino functional silicone oil molecules having one and only one amino group is calculated to be 62%. All of this amino oil concentrate (1.382 kg) is then added to 12.438 kg of a 350 cs non-functional polydimethylsilicone oil to yield the desired 0.067 mol % amine level. An amino oil made similar to this general procedure when utilized in the above described test procedure caused hot offset to occur after only 53,000 prints.

Example III a
By comparison, an amino functional polyorganosiloxane release agent having about 0.21 mole percent aminopropyl methyl siloxy groups which on average had about three functional groups per active siloxane chain where only 18% of the active chains are monoamino when subjected to the same test provided very low release life of less than 2,000 prints.

Example III b
Also by comparison an amino functional polyorganosiloxane release agent similar to Example IIIa but with 0.07 mole percent aminopropyl methyl siloxy groups which provides about 3 functional group per active siloxane chain was evaluated. Again, only 18% of the active chains were monoamino. When subjected to the same test this release agent failed at about 1,000 prints.

Example IV
Also by comparison the same web fixture test was carried out for Xerox 5090 mercapto functional oil at a slower process speed of 6.25 cm/sec which provided a nip dwell of 80 millisecond compared to 21 millisecond for the other web fixture tests and a fuser roll temperature of 305° F. because of the slower speed. The Viton GF/fuser roll had 15 pph copper oxide. When used with the polyester toner as set forth in the above examples, failure was observed within five prints.

As may readily be observed from the above examples the release agent having amino functional silicone oil molecules having one and only one polyorgano amino functional group provides a dramatically long life with no hot offset after 500,000 prints which is characteristic of the life required in high volume, high speed, high quality electrostatographic machines. Example I illustrate this with the fraction of amino functional oil molecules having one and only one amino group at 96%. This amino functional oil was prepared by the batch process.

By contrast, the concentrate of Example II is prepared to provided 62% of the amino functional silicone oil molecules having one and only one amino group then diluted, had failure after only 53,000 prints. While clearly acceptable in certain applications, it is not acceptable in high volume, high speed machines producing high quality prints. Examples III a and III b illustrate the very low release life of amino functional oils when only 18% of the active chains are monoamine. Example IV illustrates the virtually nonexistent release life of conventional mercapto functional oil. Also a comparison of Examples I, II, IIIa and IIIb shows that with decreasing monofunctionality there is a corresponding decrease in life prior to failure.

Thus, according to the present invention a substantially improved fusing system, method and release agent have been provided and in particular a system wherein the release performance is dramatically improved over the multifunctional amino release agents. Furthermore, by limiting the number of functional amino groups per polyorganosiloxane chain to one and only one in at least 85% and preferably about 93% of the chains, the opportunity for the release agent to react with both the hydrofluoroelastomer fusing surface and the toner in such a manner as to adhere the two together thereby preventing the desired quality of release leading to failure from offset has been prevented. Most importantly, with this high degree of amino monofunctionality in the silicone release agent, the fusing system according to the present invention has application for extended us in high speed high volume and high quality printing machines. In addition, since no metal or metal oxide filler is required in the fusing surface to act as a reactive site to anchor the mercapto functional fluid reductions in fabrication costs are achieved as well as improved performance as noted above together with reduced reactivity with charge control agents and no odor.

All the patents and applications referred to herein are hereby specifically and totally incorporated herein by reference in their entirety in the instant specification.

While the invention has been described in detail with reference to specific and preferred embodiments it will be appreciated that various modifications and variation will be apparent to the artisan. Accordingly, all such modifications and embodiments as may readily occur to one skilled in the art are intended to be within the scope of the appended claims.

It is claimed:

1. An imaging system comprising means to form an unfused toner image on a substrate surface by use of a toner, said toner being susceptible to reaction with amines, fusing means to fuse said toner to said substrate surface comprising a fuser member and a backup pressure member to fuse said toner to said substrate surface as said substrate is transported between said fuser member and said pressure member, said fuser member comprising a thermally stable FKM hydrofluoroelastomer fusing surface and means to deliver a release agent to said substrate surface, said release agent comprising a fluid amino functional oil containing an active molecule having the following formula I:

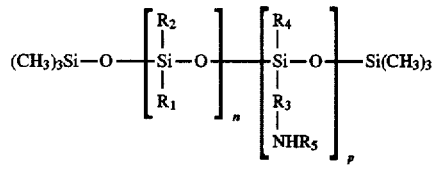

where $50 \leq n \leq 200$, P is from 1 to 5 and $R_1$, $R_2$ and $R_3$ are selected from the group consisting of alkyl and arylalkyl radicals having 1 to 18 carbon atoms; $R_4$ is selected from the group consisting of alkyl having 1 to 18 carbon atoms, arylalkyl radicals having 1 to 18 carbon atoms and a polyorganosiloxane chain having 1 to 100 diorganosiloxy repeat units; and $R_5$ is selected from the group consisting of hydrogen, alkyl and arylalkyl radicals having 1 to 18 carbon atoms, with the proviso that in at least 85% of the active molecules of the above formula I in said fluid amino functional oil contains the amino functional siloxane chains of the following formula II have p equal to 1 and wherein when p is from 2–5 the amino functional siloxane chains of the following formula II

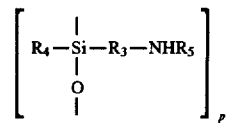

are situated at random along the active molecule, said fluid amino functional oil having predominantly monoamino functionality per active molecule to interact with said hydrofluoroelastomer fusing surface to provide an interfacial barrier layer to said toner and a low surface energy film to release said toner from said fusing surface.

2. The imaging system of claim 1 wherein about 93% of the amino functional siloxane chains have p equal to 1.

3. The imaging system of claim 1 wherein said amino siloxane functional chains are comprised of aminopropyl methyl siloxy groups.

4. The imaging system of claim 1 wherein said fluid amino functional oil remains functionally fluid at temperatures of from about 30° F. to about 450° F.

5. The imaging system of claim 1 wherein said fluid amino functional oil has a viscosity of from about 100 to about 1000 centipoise at 20° C.

6. The imaging system of claim 1 wherein said toner has an unsaturated olefinic bond that can react with amino groups.

7. The imaging system of claim 1 wherein said toner is an unsaturated polyester.

8. The imaging system of claim 1 wherein the toner comprises an ester of a carboxylic acid.

9. The imaging system of claim 1 wherein said fluid amino functional oil reacts with only one of the toner and the hydrofluoroelastomer fusing surface.

10. The image system claim 9 wherein said toner is an unsaturated polyester.

11. The imaging system of claim 9 wherein said fluid amino functional oil remains functionally fluid at temperatures up to at least 400° F.

12. The imaging system of claim 9 wherein said fluid amino functional oil reacts with only one of the toner and the hydrofluoroelastomer fusing surface.

* * * * *